(No Model.)

Z. T. HARNISH.
DRAFT BAIL.

No. 448,030.          Patented Mar. 10, 1891.

Witnesses
Geo. E. Frech
W. S. Duvall

Inventor
Zachariah T. Harnish
By his Attorneys,
C. A. Snow & Co.

THE NORRIS PETERS CO., PHOTO-LITHO., WASHINGTON, D. C.

UNITED STATES PATENT OFFICE.

ZACHARIAH T. HARNISH, OF WATER STREET, PENNSYLVANIA.

DRAFT-BAIL.

SPECIFICATION forming part of Letters Patent No. 448,030, dated March 10, 1891.

Application filed April 3, 1890. Serial No. 346,499. (No model.)

*To all whom it may concern:*

Be it known that I, ZACHARIAH T. HARNISH, a citizen of the United States, residing at Water Street, in the county of Huntingdon and State of Pennsylvania, have invented a new and useful Draft-Bail, of which the following is a specification.

This invention has relation to spring draft-bails adapted to be used as a clevis for a plow or for a doubletree wagon or to be attached to any object designed to be hauled or dragged. The invention, however, is especially designed to be employed as a draft-link or clevis for plows, certain portions of the invention being designed for co-operation therewith.

Among the objects of the invention are to relieve the team of sudden jerks and jars upon their shoulders, as caused by an uneven running of the plow or other object being hauled, to ease the start by slightly yielding as the draft is applied, and to regulate or dispose the draft in such a way as to cause the plow to take either more or less land or to run deeper or shallower, as desired.

With these objects in view the invention consists in certain features of construction hereinafter specified, and particularly pointed out in the claim.

Figure 1:
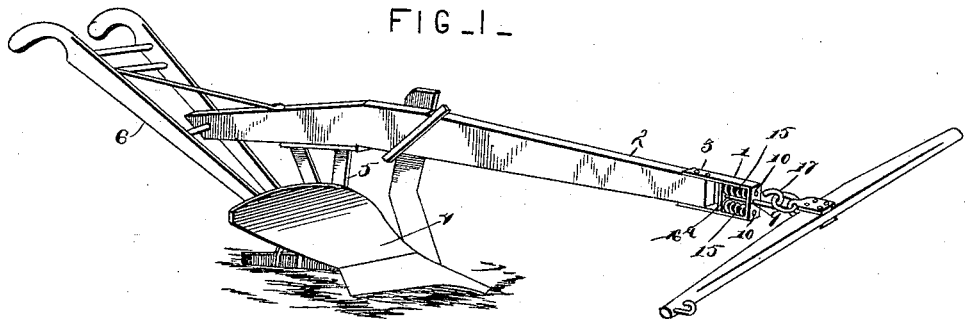
Figure 2:
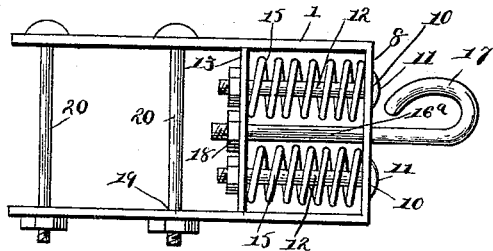
Figure 3:
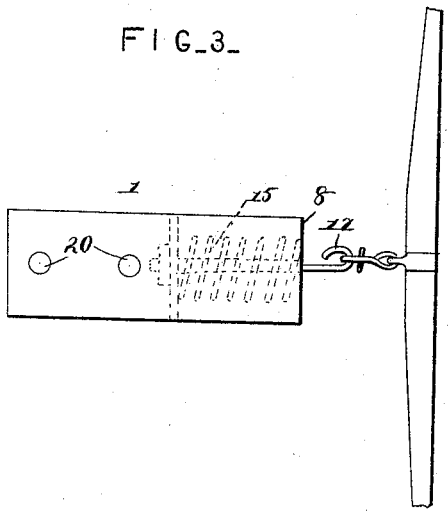

Referring to the drawings, Figure 1 is a perspective of a plow provided with a clevis constructed in accordance with my invention. Fig. 2 is a side view of the clevis. Fig. 3 is a plan view.

Like numerals of reference indicate like parts in all the figures of the drawings.

1 represents the U-shaped bail, and 2 the plow-beam, to which the bail is connected by means of a vertical bolt 3. The plow-beam is provided with the usual mold-board 4, plow-standard 5, and handles 6, or, as will hereinafter be apparent, any of the various styles of plows may be substituted for that herein shown.

The clevis or bail, which is U-shaped, is provided at its front end with the transverse portion or bar 8, having a central perforation 9, and at each side above and below the same with perforations 10. In the perforations 10 there are mounted rearwardly-disposed guide-bolts 11, the ends of which are passed through corresponding perforations 12, formed in a plate 13, located between the terminals of the bail or clevis. In rear of the plate the bolts are provided with nuts, which prevent the plate from leaving the bolts and act as stops for said plate. The plate is designed for movement upon the guide-bolts, and is pressed to the rear or against the nuts by means of a pair of coiled springs 15, interposed between the plate and the front transverse bar 8, a spring being coiled upon each of the bolts. The plate is provided near its center with an opening 16, which aligns with the opening 9 in the front transverse bar of the clevis or bail, and mounted in said openings is the shank 16ª of the draft-hook 17. The shank is straight and has its rear end projecting beyond the plate and provided with a head or nut 18. The hook 17 is located at one side of the shank at the front end of the same and is designed to receive the draft-yoke 21, connected with the single-tree of a harness. The rear portions of the terminals of the bail are provided with opposite perforations 19, and through the same are passed bolts 20, which also pass through the beam 2 of the plow.

Without disconnecting the singletree from the draft-hook, it is apparent that, in that said hook is swiveled, the same may be half rotated, so as to project at one side of or below its shank, and thus dispose the line of draft either above or below the shank of the hook and either elevate or depress the point of the plow. By disconnecting the hook from the yoke and connecting the same with the loose ring 23 of the yoke and giving the hook a quarter-turn either to the right or left, so as to be above its shank or the line of draft, it is apparent that the plow-point is slightly deflected, so that the plow runs to the left or right in accordance with the side of the shank at which the hook is located, rather than if the connection was in line with the line of draft. By turning the hook so that it will be below the line of draft, the plow-point is elevated and runs shallower. By turning the hook to the left the plow-point is thrown to the right, so as to take more land, and by turning the hook to the right the plow-point is disposed slightly to the left, so as to take less land. In this manner it will be apparent that the plow may be regulated without the necessity of loosening bolts and setting the plow-points or other devices usually employed for regulating the depth of the furrow.

If desired, the device may be used with great advantage upon wagons or any object to be hauled. In using the device upon wagons, the same is bolted to the single or double tree in the same manner as previously described with relation to the plow, and the benefits arising are practically the same, with the exception that the regulation of the plow-point is omitted. The usual jerking and straining of the animal's shoulders, as caused by sudden starting of the team, it will be observed, is avoided, in that the tension of the springs must be first overcome before the strain of the plow or other object is felt, so that a gradual strain or draft takes place, much to the relief of the shoulders of the animals.

From the above description it will be apparent that I have provided an exceedingly cheap and simple device, that may be manufactured at a minimum cost, and will obviate by reason of its many advantages the comparatively costly constructions of plows and other objects of heavy draft.

Having thus described my invention, what I claim is—

The combination, with the plow-beam, a U-shaped frame bolted to the end thereof, a plate mounted for sliding in the frame, a bolt swiveled loosely in the end of the frame and having its outer end bent only at one side of its axial center to form a hook, thus forming a seat for a connecting device at one side of the axial center of the bolt, and having a stop arranged in rear of the plate and a spring interposed between the plate and end of the frame, of a tree, a D-shaped yoke connected to the tree, and a ring loosely engaging the yoke, said ring and yoke being adapted for separate connection with the hook of the bolt, substantially as specified.

In testimony that I claim the foregoing as my own I have hereto affixed my signature in presence of two witnesses.

ZACHARIAH T. HARNISH.

Witnesses:
J. H. SIGGERS,
R. J. MARSHALL.